US009525482B1

United States Patent
Tse

(10) Patent No.: US 9,525,482 B1
(45) Date of Patent: Dec. 20, 2016

(54) APPARATUS AND METHOD FOR MEASUREMENT OF PROPAGATION TIME OF A DATA STREAM IN A TRANSPORT NETWORK

(71) Applicant: Microsemi Storage Solutions (U.S.), Inc., Aliso Viejo, CA (US)

(72) Inventor: Richard Tse, Vancouver (CA)

(73) Assignee: Microsemi Storage Solutions (U.S.), Inc., Aliso Viejo, CA (US)

( * ) Notice: Subject to any disclaimer, the term of this patent is extended or adjusted under 35 U.S.C. 154(b) by 91 days.

(21) Appl. No.: 14/617,505

(22) Filed: Feb. 9, 2015

(51) Int. Cl.
*H04B 10/079* (2013.01)
*H04J 3/06* (2006.01)

(52) U.S. Cl.
CPC ........... *H04B 10/0795* (2013.01); *H04J 3/067* (2013.01)

(58) Field of Classification Search
CPC ............................ H04J 3/067; H04B 10/0795
See application file for complete search history.

(56) References Cited

U.S. PATENT DOCUMENTS

2010/0080248 A1* 4/2010 Aweya ................. H04J 3/0697 370/503
2013/0266323 A1 10/2013 Tan

FOREIGN PATENT DOCUMENTS

WO 2013170910 A1 11/2013
WO 2014037061 A1 3/2014

* cited by examiner

*Primary Examiner* — Leslie Pascal
(74) *Attorney, Agent, or Firm* — Dennis R. Haszko

(57) ABSTRACT

A method and system are provided for measuring the propagation time, or one-way delay or latency, of an 8B/10B data stream, such as a CPRI stream, through a network using a transport network protocol, such as OTN. Embodiments of the present disclosure do not modify the CPRI client and are unlimited in the amount of delay that can be measured. At first and second network endpoints, information is gathered related to patterns associated with successive occurrences of a control character in the 8B/10B encoded data stream. This information is sent over a side channel separate from the 8B/10B encoded data stream. The one-way delay is determined based on a difference between the information related to the pattern identified at the first and second network endpoints.

21 Claims, 5 Drawing Sheets

APPARATUS AND METHOD FOR MEASUREMENT OF PROPAGATION TIME OF A DATA STREAM IN A TRANSPORT NETWORK

FIELD

The present disclosure relates generally to optical communications. More particularly, the present disclosure relates to a system and method for facilitating transport of constant bit rate (CBR) client data streams over an Optical Transport Network (OTN).

BACKGROUND

OTN is a protocol standard that is used for carrying multiple client signals or data streams on optical fibers over long distances with carrier-grade operations, administration, and management (OAM) functionality. OTN offers Time Division Multiplex (TDM) functionality that allows many independent client signals or data streams to be mapped and multiplexed into a higher-rate bit stream and then allows the higher-rate bit stream to be de-multiplexed and de-mapped back into the original independent client signals or data streams with low bit error rate and high fidelity transfer of frequency and phase of the client signals or data streams.

The ability to carry more than one client signal or data stream within each OTN stream reduces the number of optical wavelengths or optical fibers required to physically connect all client signal or data stream sources to their destinations. OTN's Forward Error Correction (FEC) operations add at least 6 dB of signal enhancement to the client, facilitating transmission over long distances or facilitating a reduction in the number of optical amplifiers needed. OTN's OAM operations enable communication connections to be properly set up and configured, errors to be monitored, counted, and located, and protection switching to be triggered under failure conditions.

OTN devices introduce asymmetric delay when carrying multiple client signals or data streams. The introduction of asymmetric delay renders OTN devices using the known OTN protocol standard incapable of carrying two-way symmetric client signals or data streams, such as those described in Institute of Electrical and Electronics Engineers (IEEE) 1588 and the Common Public Radio Interface (CPRI) standards.

Improvements to OTN devices using the OTN protocol standard to facilitate the transport of two-way symmetric client signals or data steams over an OTN are therefore desirable.

BRIEF DESCRIPTION OF THE DRAWINGS

Embodiments of the present disclosure will now be described, by way of example only, with reference to the attached Figures.

DETAILED DESCRIPTION

Figure 1:
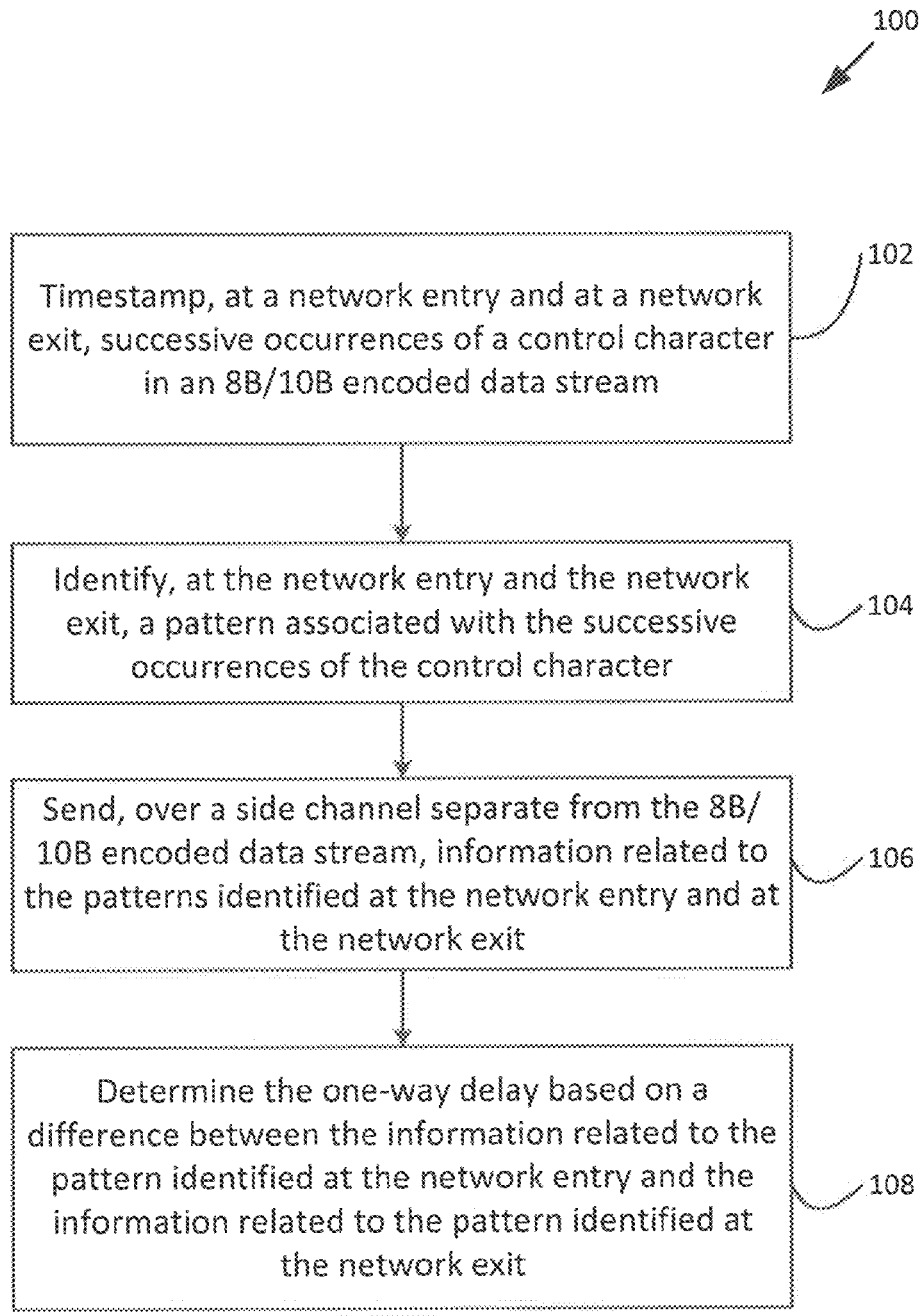
FIG. 1 illustrates a flowchart of a method of measuring a one-way delay of a CPRI stream transported over a transport network according to an embodiment of the present disclosure

A method and system are provided for measuring the propagation time, or one-way delay or latency, of an 8B/10B data stream, such as a CPRI stream, through a network using a transport network protocol, such as OTN. Embodiments of the present disclosure do not modify the CPRI client and are unlimited in the amount of delay that can be measured. At first and second network endpoints, information is gathered related to patterns associated with successive occurrences of a control character in the 8B/10B encoded data stream. This information is sent over a side channel separate from the 8B/10B encoded data stream. The one-way delay is determined based on a difference between the information related to the pattern identified at the first and second network endpoints.

Embodiments of the present disclosure relate to a system and method for measuring the propagation time, or one-way delay or latency, of an 8B/10B encoded data stream such as a CPRI stream through a network using a transport network protocol, such as OTN. Embodiments of the present disclosure do not modify the CPRI client, and enable arbitrarily long uplink and/or downlink delays to be measured.

8B/10B is a line code that maps 8-bit symbols into 10-bits symbols to achieve DC balance. Because of the many extra possible symbols in the 10-bit space, only those that have 4, 5, or 6 ones (1s) within the 10 bit character are used.

The term control character refers to a special 10-bit character or symbol in 8B/10B coding which comprises a valid sequence of bits, with no more than six 1s or 0s, but which does not have a corresponding 8B data byte. Control characters are used for low-level control functions.

Control characters can be periodically recurring, such as a comma character. Comma characters have special properties that allow an 8B/10B receiver to find character alignment. Examples of comma characters in 8B/10B coding include K.28.1, K.28.5 and K.28.7. In CPRI, the only comma character used is the K.28.5 character, which occurs approximately every 66.67 microseconds.

Other control characters are non-periodically recurring control characters, which do not recur with any regularity or periodicity with respect to the interval between recurrences. In an embodiment, a non-periodically recurring control character is non-periodic with respect to a period of measurement. In another embodiment, non-periodically recurring control characters have different intervals between recurrences, or randomly recur. The K.27.7 character is a non-periodically recurring control character that is used in Gigabit Ethernet.

A current running disparity (CRD) is the state of the running disparity when a symbol or character starts. For example, a character that has six logical ones in it will only be used if the running disparity is currently negative. Thus, it is called a RD-character. Similarly, a character that has four logical ones in it will only be used if the running disparity is currently positive. Thus, it is called a RD+ character. Characters with five logical ones in it may be either a RD+ or RD- character and, in some cases, the same 10-bit pattern is used for both CRDs. The CRD at the end of a character is updated by the number of ones in the character.

CRD is a defined property of each 10B character. In any sequence of control characters, there will be an associated sequence of CRDs.

In an embodiment, the present disclosure provides a method of measuring a one-way delay of an 8B/10B encoded data stream transported over a transport network. The method comprises: timestamping, at a network entry and at a network exit, successive occurrences of a control character in the 8B/10B encoded data stream; identifying, at the network entry and the network exit, a pattern associated with the successive occurrences of the control character; sending, over a side channel separate from the 8B/10B encoded data stream, information related to the patterns identified at the network entry and at the network exit; and determining the one-way delay based on a difference between the information related to the pattern identified at the network entry and the information related to the pattern identified at the network exit.

In an example embodiment, the control character comprises a periodically-recurring control character, wherein each of the successive occurrences of the control character have associated therewith a current running disparity (CRD), and wherein the pattern comprises a sequence of the CRDs of the periodic control characters.

In an example embodiment, the periodically-recurring control character comprises a comma character used for synchronization.

In an example embodiment, the 8B/10B encoded data stream comprises a Common Public Radio Interface (CPRI) stream, and wherein the periodically-recurring control character comprises a K.28.5 character. In an example embodiment, the method further comprises: associating each timestamp with a specific CPRI Hyperframe at the network entry and at the network exit to facilitate measurement of the one-way delay.

In an example embodiment, the control character comprises a non-periodically-recurring control character which is non-periodic with respect to a period of measurement, and wherein the pattern comprises a pattern of time gaps between the successive occurrences of the non-periodically recurring control characters.

In an example embodiment, the transport network comprises an optical transport network (OTN).

In an example embodiment, the timestamping, identifying, sending and determining are performed without modifying the 8B/10B encoded data stream.

In an example embodiment, the one-way delay comprises an uplink latency, and wherein timestamping, identifying, sending and determining are performed to determine the uplink latency.

In an example embodiment, the one-way delay comprises a downlink latency, and wherein timestamping, identifying, sending and determining are performed to determine the downlink latency.

In an example embodiment, the method further comprises recording a timestamp value associated with the timestamping. In an example embodiment, the timestamping comprises generating a plurality of timestamps, and further comprising recording a plurality of timestamp values associated with the plurality of timestamps prior to the sending of the information over the side channel.

In an example embodiment, the information related to the patterns identified at the network entry and at the network exit comprises a timestamp value.

In an example embodiment, the information related to the patterns identified at the network entry and at the network exit comprises a timestamp value and a corresponding CRD.

In another embodiment, the present disclosure provides a method of measuring a one-way delay of an 8B/10B encoded data stream transported over a transport network.

The method comprises: timestamping, at a network entry and at a network exit, successive occurrences of a control character in the 8B/10B encoded data stream, each of the successive occurrences of the control character having associated therewith a current running disparity (CRD); identifying, at the network entry and the network exit, successive occurrences of the control character; sending, over a side channel separate from the 8B/10B encoded data stream, information related to the successive occurrences of the control character at the network entry and at the network exit; and determining the one-way delay based on a difference between the information related to the successive occurrences of the control character at the network entry and the information related to the successive occurrences of the control character at the network exit.

In an example embodiment, the information related to the patterns identified at the network entry and at the network exit comprises a timestamp value and a corresponding CRD.

In an example embodiment, the method further comprises recording one or more timestamp values associated with the timestamping prior to the sending of the information over the side channel.

In a further embodiment, the present disclosure provides a method of measuring a one-way delay of an 8B/10B encoded data stream transported over a transport network. The method comprises: timestamping, at a first network endpoint, successive occurrences of a control character in the 8B/10B encoded data stream; identifying, at the first network endpoint, a pattern associated with the successive occurrences of the control character; sending, over a side channel separate from the 8B/10B encoded data stream, information related to the pattern identified at the first network endpoint; and determining the one-way delay based on a difference between the information related to the pattern identified at the first network endpoint and information related to a pattern associated with successive occurrences of the control character at a second network endpoint.

In an example embodiment, the information related to the patterns identified at the network entry and at the network exit comprises a timestamp value.

In an example embodiment, the method further comprises recording one or more timestamp values associated with the timestamping prior to the sending of the information over the side channel.

In another embodiment, the present disclosure provides a non-transitory machine readable medium having stored thereon statements and instructions for execution by a processor to perform a method as described herein.

In a further embodiment, the present disclosure provides a method of measuring a one-way delay of a CPRI client transported over an optical transport network (OTN). The method comprises: timestamping arrival of the CPRI client at a first OTN endpoint; timestamping departure of the CPRI client from a second OTN endpoint; and determining the one-way delay of the CPRI client through the OTN network by calculating a difference between the timestamp of the CPRI client departure from the second OTN endpoint and the CPRI client arrival at the first OTN endpoint.

In an example embodiment, timestamping the CPRI client arrival is performed in response to detection, at the first OTN endpoint, of a CPRI Hyperframe delimiter character.

In an example embodiment, timestamping the CPRI client departure is performed in response to detection, at the second OTN endpoint, of a CPRI Hyperframe delimiter character.

In another embodiment, the present disclosure provides a system for measuring a one-way delay of an 8B/10B encoded data stream transported over a transport network. The system comprises: first and second timestampers, provided at a network entry and at a network exit, respectively, configured to timestamp successive occurrences of a control character in the 8B/10B encoded data stream; first and second timestamp processors configured to identify, at the network entry and the network exit respectively, a pattern associated with the successive occurrences of the control character; and first and second transport network devices configured to send, over a side channel separate from the 8B/10B encoded data stream, information related to the patterns identified at the network entry and at the network exit. The first and second transport network devices cooperate to determine the one-way delay based on a difference between the information related to the pattern identified at the network entry and the information related to the pattern identified at the network exit.

In an example embodiment, the first timestamper and the first timestamp processor are integral with the first transport protocol device.

In an example embodiment, the second timestamper and the second timestamp processor are integral with the second transport protocol device.

In a further embodiment, the present disclosure provides a system for measuring a one-way delay of an 8B/10B encoded data stream transported over a transport network. The system comprises: first and second programmable logic devices, provided at a network entry and a network exit, respectively, configured to timestamp successive occurrences of a control character in the 8B/10B encoded data stream and to identify a pattern associated with the successive occurrences of the control character; first and second transport network devices, in communication with the first and second programmable logic devices, respectively, configured to send, over a side channel separate from the 8B/10B encoded data stream, information related to the patterns identified at the network entry and at the network exit; one or more processors; and one or more non-transitory machine readable memories storing statements and instructions for execution by the one or more processors to determine the one-way delay based on a difference between the information related to the pattern identified at the network entry and the information related to the pattern identified at the network exit.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

FIG. 1 illustrates a flowchart of a method 100 of measuring a one-way delay of an 8B/10B data stream, such as a CPRI stream, transported over a transport network according to an embodiment of the present disclosure. In an example embodiment, the transport network comprises an optical transport network (OTN). The method comprises, at 102, timestamping, at a network entry and at a network exit, successive occurrences of a control character in the 8B/10B encoded data stream. In an example embodiment, successive occurrences of the same control character are timestamped at both the network entry and the network exit. In an example embodiment, 102 further comprises recording or saving a timestamp value associated with the step of timestamping. For example, in an implementation, the values of a number of timestamps are saved before they are sent over a sideband channel and processed.

At 104, the method comprises identifying, at the network entry and the network exit, a pattern associated with the successive occurrences of the control character. In an example embodiment wherein the control character comprises a periodically-recurring control character, and wherein each of the successive occurrences of the control character have associated therewith a current running disparity (CRD), the pattern comprises a sequence of the CRDs of the periodically-recurring control characters. In an example embodiment, the periodically-recurring control character comprises a comma character used for synchronization. For example, when the 8B/10B encoded data stream comprises a CPRI stream, the periodically-recurring control character can comprise a K.28.5 character.

In another embodiment, the control character comprises a non-periodically-recurring control character which is non-periodic with respect to a period of measurement. In such an example embodiment, the pattern comprises a pattern of time gaps between the successive occurrences of the non-periodically recurring control characters.

At 106, the method comprises sending, over a side channel separate from the 8B/10B encoded data stream, information related to the patterns identified at the network entry and at the network exit. The information sent over the side channel is separate from the 8B/10B data stream, and the side channel is separate from the channel on which the 8B/10B data stream is sent. In an example embodiment, the 8B/10B data stream is a CPRI stream sent in a payload channel, and the side channel is an overhead channel. In an example embodiment, the information related to the patterns identified at the network entry and at the network exit comprises a timestamp value and a corresponding CRD. In another example embodiment, the information sent is just the timestamp value.

At 108, the method comprises determining the one-way delay based on a difference between the information related to the pattern identified at the network entry and the information related to the pattern identified at the network exit.

In an example embodiment, the method further comprises associating each timestamp with a specific CPRI Hyperframe at the network entry and at the network exit to facilitate measurement of the one-way delay.

In an example embodiment, the recording and timestamping, identifying, sending and determining are performed without modifying the 8B/10B encoded data stream.

In an example embodiment, the one-way delay comprises an uplink latency, and the steps of recording and timestamping, identifying, sending and determining are performed to determine the uplink latency. In another example embodiment, the one-way delay comprises a downlink latency, and the steps of recording and timestamping, identifying, sending and determining are performed to determine the downlink latency.

The sending in 106 of the information over the side channel permits the 8B/10B data stream to be unaffected and unmodified by the one-way delay determination which concludes in 108. In this way, the one-way delay is determined while preserving the transparency of the 8B/10B data stream, which in an example embodiment using CPRI is a CPRI client with respect to the transport network. This is in contrast to known approaches which modify the CPRI client in some way in order to determine delay or communicate asymmetry induced by the transport network, which can violate demarcation limits or boundaries between a wireless service provider (e.g. the owner of the CPRI client) and a transport service provider (e.g. the owner of the OTN transport network). Determining one-way delay while preserving transparency of the CPRI stream, while ensuring that the CPRI stream is unmodified, is an advantage of embodiments of the present disclosure.

In an alternate example embodiment in which patterns are not explicitly identified, step 104 can comprise identifying, at the network entry and the network exit, successive occurrences of the control character. In an example embodiment, step 106 comprises sending, over a side channel separate from the 8B/10B encoded data stream, information related to the successive occurrences of the control character at the network entry and at the network exit. In an example embodiment, step 108 comprises determining the one-way delay based on a difference between the information related to the successive occurrences of the control character at the network entry and the information related to the successive occurrences of the control character at the network exit.

In another embodiment, a method of measuring a one-way delay of an 8B/10B encoded data stream transported over a transport network comprises: recording and timestamping, at a first network endpoint, successive occurrences of a control character in the 8B/10B encoded data stream; identifying, at the first network endpoint, a pattern associated with the successive occurrences of the control character; sending, over a side channel separate from the 8B/10B encoded data stream, information related to the pattern identified at the first network endpoint; and determining the one-way delay based on a difference between the information related to the pattern identified at the first network endpoint and information related to a pattern associated with successive occurrences of the control character at a second network endpoint. In an example embodiment, the information related to the patterns identified at the first network endpoint and at the second network endpoint comprises a timestamp value and a corresponding CRD. In another example embodiment, the information sent is just the timestamp value.

Figure 2:
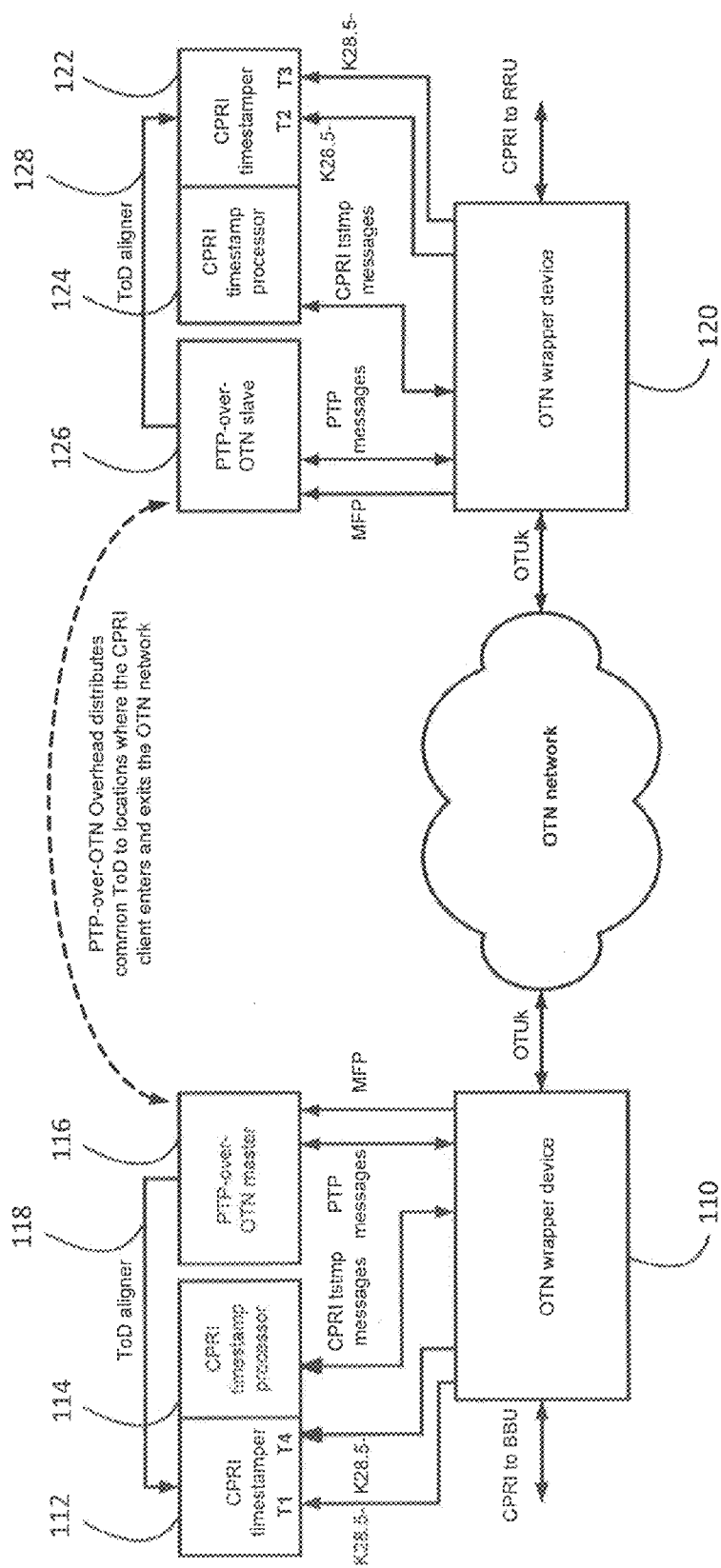
FIG. 2 illustrates a network diagram of an example implementation of CPRI-over-OTN according to an embodiment of the present disclosure.

FIG. 2 illustrates a network diagram of an example implementation of CPRI-over-OTN according to an embodiment of the present disclosure. A link shown in FIG. 2 includes a Precision Time Protocol (PTP)-over-OTN for synchronizing the two nodes of the link, and a CPRI timestamper and timestamp processor for timestamping /K28.5/ side channel data as described according to an example embodiment of the disclosure below. In an example embodiment, PTP-over-OTN overhead is employed to distribute a common time of day to locations where a CPRI client enters and exits the OTN network.

For example, OTN wrapper device 110 is configured to identify the CRD of the K28.5 control character and to map the CPRI client into OTN. The OTN wrapper device 110 is an example of a network endpoint, or a network entry. In an example embodiment, an OTN overhead side-band channel, over which the information related to the patterns identified at the network endpoint is carried, is also created and terminated at the OTN wrapper device 110. A CPRI timestamper 112 is configured to record the time at which each of the K28.5 control characters occur. A CPRI timestamp processor 114 creates-and-sends the information to the sideband OTN overhead channel or terminates-and-processes the information from the sideband OTN overhead channel.

The operation of the OTN wrapper device 120, CPRI timestamper 122 and CPRI timestamp processor 124 are similar to the OTN wrapper device 110, CPRI timestamper 112 and CPRI timestamp processor 114, respectively.

In an implementation, PTP-over-OTN is used to create the same clock on both sides of the OTN network so the timestamps have a common reference. For example, as shown in FIG. 2, a PTP-over-OTN master 116 provides a clock, or time of day (ToD) aligner, 118 to the CPRI timestamper 112. Similarly, a PTP-over-OTN slave 126 provides a clock, or ToD aligner, 128 to the CPRI timestamper 122. In other embodiments, different implementations other than PTP-over-OTN can be used to create a common reference clock. The "CPRI-to-BBU" and "CPRI-to-RRU" text in FIG. 2 indicates where the CPRI datapath comes from or goes to.

In an example embodiment, the CPRI timestamper 112 and the CPRI timestamp processor 114 are integral with the OTN wrapper device 110. In another example embodiment, the CPRI timestamper 122 and the CPRI timestamp processor 124 are integral with the OTN wrapper device 120.

In an exemplary method of an embodiment of the present disclosure, the measurement of latency uses special CPRI symbols known as /K28.5/ characters. The CPRI protocol sends /K28.5/ characters at every hyperframe event, which in turn occur approximately every 66.67 µs. The exemplary method first synchronizes the two nodes of the link, for example using a precision time protocol (PTP) to align time of day (ToD). The method records a first pattern of multiple /K28.5/ characters at a first node, for example at the OTN wrapper device 110 in FIG. 2. Since /K28.5/ characters appear at identical periodic intervals, a pattern of CRDs of multiple /K28.5/ characters is needed for the purpose of measuring latency. This first pattern is timestamped at the location in time indicated by T1 as shown in FIG. 2. The method sends this first pattern recorded at the first node to the second node via a side channel. No measurement data is inserted into the OTN data stream.

The method then records a second pattern of CRDs of multiple /K28.5/ characters at a second node, for example at the OTN wrapper device 120 in FIG. 2, and timestamps this pattern at the location in time indicated by T2. Though the first pattern and the second pattern may not be identical because their recordings may not have started and ended at the same boundaries, the portion of the patterns of successive CRDs of /K28.5/ characters will match during the recording period that is common. Since both nodes are synchronized and both patterns are timestamped, when the method identifies a commonality in the two patterns, the method can calculate the latency between the first node and the second node in a first direction.

Recording and comparing patterns of /K28.5/ characters allows the method to measure latency that exceeds 66.67 µs, which is the nominal interval between /K28.5/ characters in a CPRI datastream.

In an example embodiment, the method can measure the delay in a second direction, from the second node to the first node, using substantially the same steps, and timestamps T3 and T4. Having recorded the latency of the OTN network in two directions, the method can optionally determine the difference in the uplink and downlink latencies and then optionally include steps to reduce the delay difference.

While the exemplary method describes carrying CPRI data over an OTN network, the method can also be applied to CPRI data carried over an Ethernet network, or another 8B/10B encoded data stream carried over another transport network.

According to a method of an embodiment of the present disclosure, no information is inserted into the CPRI data. Since the delay information can be carried in a side channel, the client data stream does not need to be terminated, resulting in less latency. Furthermore, the OTN client does not need to be altered.

In an embodiment, in relation to FIG. 2, the present disclosure provides a method of measuring a one-way delay of a CPRI client transported over an optical transport network (OTN), according to an embodiment of the present disclosure, comprising: timestamping arrival of the CPRI client at a first OTN endpoint; timestamping departure of the CPRI client from a second OTN endpoint; and determining the one-way delay of the CPRI client through the OTN network by calculating a difference between the timestamp of the CPRI client departure from the second OTN endpoint and the CPRI client arrival at the first OTN endpoint.

In an example embodiment, timestamping the CPRI client arrival is performed in response to detection, at the first OTN endpoint, of a CPRI Hyperframe delimiter character. In an example embodiment, timestamping the CPRI client departure is performed in response to detection, at the second OTN endpoint, of a CPRI Hyperframe delimiter character.

A detailed example embodiment will now be described, in relation to a method of measuring a one-way delay of an 8B/10B encoded data stream transported over a transport network, using a periodically-recurring control character.

In an example implementation, to enable one-way delay measurement across the transport network, it is required that a common timescale and epoch be established on both ends of the network. The term epoch refers to a reference point from which time is measured. In an example OTN network implementation, a PTP-over-OTN overhead mechanism is used to establish this first requirement, though other approaches may be used.

Once a common timescale and epoch is established, the one-way measurement is performed by:

1. Timestamping the arrival of the CPRI client as it enters the first OTN function, $T_{arrive}$. The timestamp is generated when the CPRI Hyperframe delimiter character, K28.5, is detected as it enters the first OTN function.

2. Timestamping the departure of the CPRI client as it leaves the last OTN function, $T_{depart}$. The timestamp is generated when the CPRI Hyperframe delimiter character, K28.5, is detected as it departs the last OTN function.

3. The difference between $T_{depart}$ and $T_{arrive}$ is the one-way delay of the CPRI client through the OTN transport network. This measurement is to be performed in both the uplink and the downlink directions.

As indicated earlier, the K28.5 character repeats periodically, approximately every 66.67 μs. This relatively small repetition period can limit the maximum delay that the OTN transport network can be subjected on the CPRI client before the measurement becomes uncertain. For instance, if the difference Tdepart−Tarrive=32 μs, there is uncertainty as to whether the actual delay is 32 μs or 32 μs+(N×66.67 μs), where N is any natural number.

In an example implementation, the current running disparity (CRD) property of the K28.5 character is used to resolve this problem. For every CPRI Hyperframe, the K28.5 character will be of either a positive or a negative CRD, with both CRDs having an equal probability of occurring (due to randomness in the CPRI datastream, which can be further guaranteed using a scrambling mechanism as known in the art). If the timestamp and the corresponding CRD of the K28.5 character are gathered over a number of consecutive samples at both OTN endpoints, the sequence of the CRDs can be used to match the timestamps in the two sets of data. If the sequences in these two series are matched up over a sufficiently large number of samples, then this match will have an acceptably low probability of error.

If x samples are used, the probability of a random but erroneous alignment match between any timestamp on the end where the CPRI client arrives at the OTN network and a timestamp on the end where the CPRI client departs the OTN network is $1/2^x$. If the values of the timestamps are included in the alignment algorithm, then the probability of error can be further reduced.

In an example implementation, to cover all N possible matches, the number of samples, x, must be at least 2N−1. But, in a further example implementation, to reduce the probability of a mismatch, x should be much larger than this minimum value. This is illustrated by the following example:

1. In a CRAN application, the maximum allowed latency between the two endpoints is 150 μs and the minimum allowed latency between two endpoints is 0ps, so only $$N=\text{ROUNDUP}(150\ \mu s/66.67\ \mu s)=3$$

departure timestamps would compete for alignment with any one arrival timestamp.

2. Thus, for the $T_{arrive}$ timestamp, only the N=3 $T_{depart}$ timestamps that are within 150 μs of each other will be considered for the match.

3. If x=20 samples, then the probability of a random match is $1/2^{20}$.

4. With x=20 samples, the CRD sequence for the $T_{arrive}$ timestamp and the next 19 $T_{arrive}$ timestamps will be compared with each of the three $T_{depart}$ timestamps and their corresponding next 19 $T_{depart}$ timestamps.

5. If the CRD is the same for all (x+N−1)=22 samples, then this sample cannot be used. The probability of this condition occurring is $2/2^x=2/2^{20}$.

6. If the CRD does not remain the same for all (x+N−1)=22 samples, then this sample can be used.

7. The probability of a mismatch at each of the N−1 false events is:

$$Pb_{false\_single} = \frac{1}{2^x - 2} = 1/1022$$

Note that 2 possibilities are eliminated because of condition #5 in the above example.

8. For all N−1 possible false matches, the total probability of a false match occurring is:

$$Pb_{false\_single} = \sum_{k=1}^{N-1} ((N-k) * (Pb_{false\_single}^k))$$

For N=3 and x=20, $Pb_{false\_match}=1.9*10^{-6}$.

9. Under these conditions, if the algorithm finds more than one match, then the procedure can be repeated until only one match is found. Alternately, a larger value of x can be used to reduce the possibility of encountering a false match condition.

It should also be noted that some forms of mapping into OTN, such as GFP-T mapping, may cause the CRD of the demapped and recovered CPRI stream to be inverted. In this case, comparisons of the CRD against the original sequence and an inverted sequence should both be applied when trying to align the timestamps.

One or more bit error events may cause the corruption or creation of a K28.5 character or cause a discontinuity in the CRD sequence. These consequences would cause the measurement mechanism to not find the appropriate alignment match between the timestamps from the two endpoints. If this happens, the measurement would have to be performed again. The probability of bit error events causing an erroneous alignment match is given by the statistical characteristics described earlier.

After aligning the timestamps using the example procedure given above, the timestamp of when the CPRI client arrived at the OTN network is subtracted from the timestamp of when the CPRI client departed the OTN network to find the one-way latency.

Note that the example procedure given above to calculate the one-way latency assumes that the K28.5 timestamps from both endpoints are available. The required transfer of timestamps from one endpoint to the other can be done through standard end-to-end OTN channels, such as the GCC channel.

Figure 3:
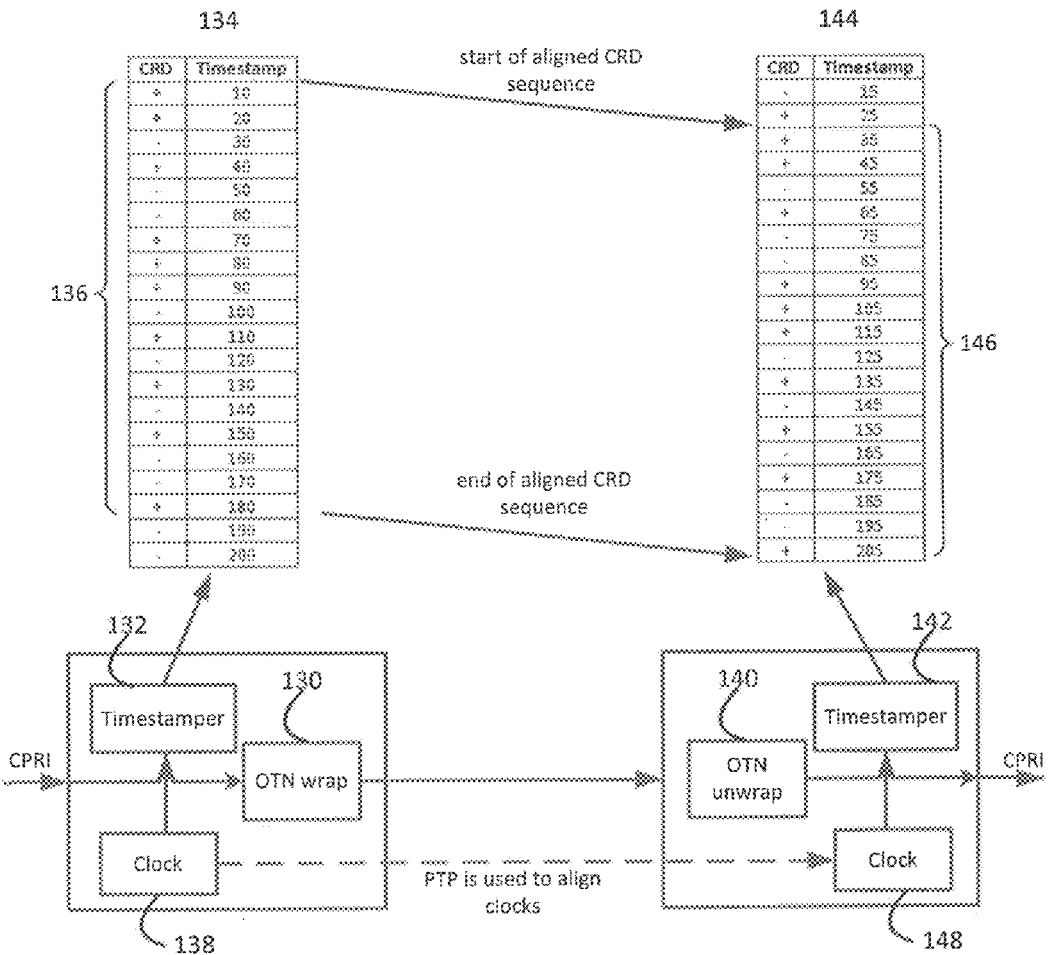
FIG. 3 illustrates an example of CRD and timestamp alignment according to an embodiment of the present disclosure.

FIG. 3 illustrates an example of CRD and timestamp alignment according to an embodiment of the present disclosure. The OTN wrapper 130 and OTN unwrapper 140 in FIG. 3 are similar to the OTN wrapper device 110 and 120, respectively, in FIG. 2. The clocks 138 and 148 in FIG. 3 are similar to the "ToD aligner" signals 118 and 128 that originate from the PTP-over-OTN master and PTP-over-OTN slave blocks, respectively, in FIG. 2. The timestampers 132 and 142 in FIG. 3 are similar to the CPRI timestampers 112 and 122 in FIG. 2, and can also include the CPRI timestamp processors 114 and 124. The tables 134 and 144 shown in FIG. 3 are generated and processed by the timestampers 132 and 142, respectively, for example by a CPRI timestamp processor function provided therein.

In this example, the timestamping event occurs every 10 units of time. Both endpoints capture a set of 20 timestamps with their corresponding CRDs. If one looks through the two sets of CRDs, shown in tables 134 and 144, it can be found that the sequences only match with one alignment, where the CRD sequence is: ++−+−−+++−+−+−+−−+. This sequence is highlighted at 136 and 146 in FIG. 3. With this matched CRD sequence, the corresponding timestamp values can be used to determine the latency between the two timestamping points. In this example, the difference between the timestamps of the aligned sequences is 25 units of time.

By running this procedure for the uplink direction and the downlink direction, the delays of both and, hence, the asymmetry will be found. Once this is completed, the OTN network can use its own mechanisms to adjust one or both latencies to reduce the asymmetry until it meets the requirements of its CPRI clients. This process can be repeated periodically and/or iteratively to continue reducing the asymmetry and to react to unexpected network error events.

In an alternative embodiment, instead of capturing both the timestamps and the running disparities of every K28.5 event, only the timestamps for either K28.5 of positive CRD or negative CRD are captured. This method may simplify the detection hardware. The events associated with the other CRD can be inferred because we know these events occur periodically, approximately every 66.67 μs.

Details regarding the method used to adjust the asymmetry are outside the scope of the embodiments of the present disclosure. However, examples of how this can be performed are discussed below to further assist in understanding.

This mapping/multiplexing adjustment function could be implemented in many ways. Some of the more generic methods are as follows.

If the mapping/multiplexing function monitors the bit rate of the incoming client data stream and adjusts its justification events to account for bit rate offsets, then the bit rate measurements can be temporarily adjusted to add or subtract an offset, causing the mapping/multiplexing function to create more or less justification events. A corresponding buffer will fill/empty as a result. For example, to get 1 μs of extra delay, an offset of −1 ppm could be added for 1 second. After this second is over, the offset would be removed.

The mapping/multiplexing function typically has a static fractional value that represents the client's nominal value. This fractional value could be temporarily modified to add a certain offset for a certain time period to mathematically determine the expected delay adjustment. For example, to get 1 μs of extra delay, the fractional value could be adjusted to increase the nominal stuffing rate by 1 ppm and keep it at this value for 1 second. After this second is over, the fractional value would be returned to its normal value.

If the mapping/multiplexing function monitors a buffer level and tries to keep this buffer at a certain threshold level by making justification events, then this threshold level can be adjusted directly to increase/decrease the depth at which this mechanism settles. The change in buffer depth provides the desired change in delay.

To increase or decrease the path delay within a device's datapath with an OTN demapping or demultiplexing function, a hardware or firmware control mechanism modifies the demapped or demultiplexed client's SERDES to speed up or slow down the data output. This will also cause the level of a buffer downstream of the demapping/demultiplexing function to fall or rise, causing the delay to decrease or increase, respectively.

This demapping/demultiplexing adjustment function could be implemented in many ways. Some of the more generic methods are:

If direct control over the nominal bit rate of the transmit SERDES (if it has a fractional-N clock synthesis unit, or CSU) can be controlled directly, it can be changed to add a certain offset for a certain time period to achieve the desired delay adjustment. For example, to get 1 μs of extra delay, the fractional-N CSU of the transmit SERDES could be adjusted to decrease its nominal bit rate rate by 1 ppm and keep it at this level for 1 second. After this time is over, the transmit SERDES' coefficients would be returned to their normal values.

If the demapping/demultiplexing function monitors a buffer level and tries keep this buffer at a certain threshold level by speeding up or slowing down its transmit SERDES, then this threshold level can be adjusted directly to increase/decrease the depth at which the control mechanism settles. The change in buffer depth provides the desired change in delay.

Figure 4:
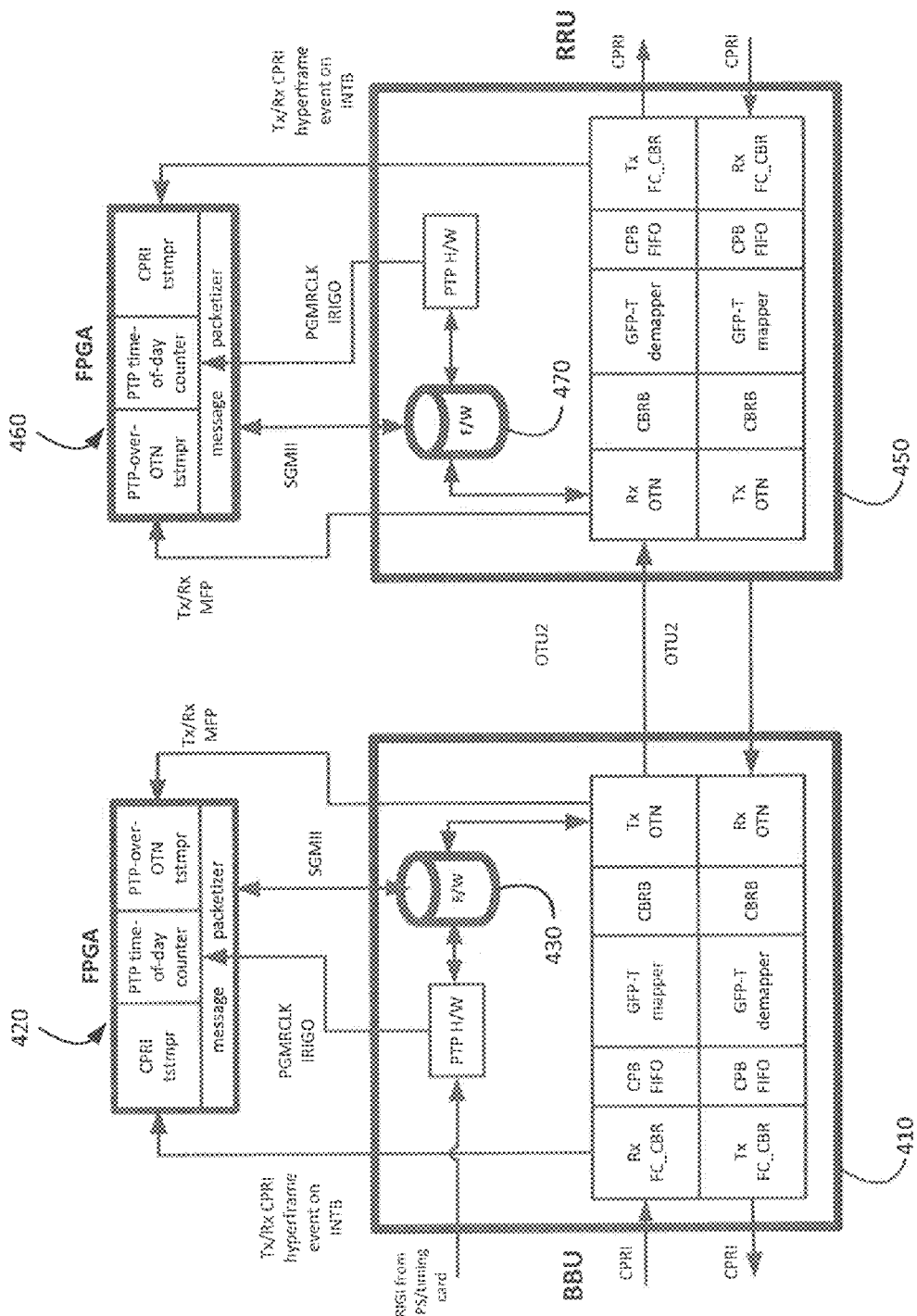
FIG. 4 illustrates a block diagram of a CPRI-over-OTN solution for measuring a one-way delay of a CPRI stream according to an embodiment of the present disclosure.
Figure 5:
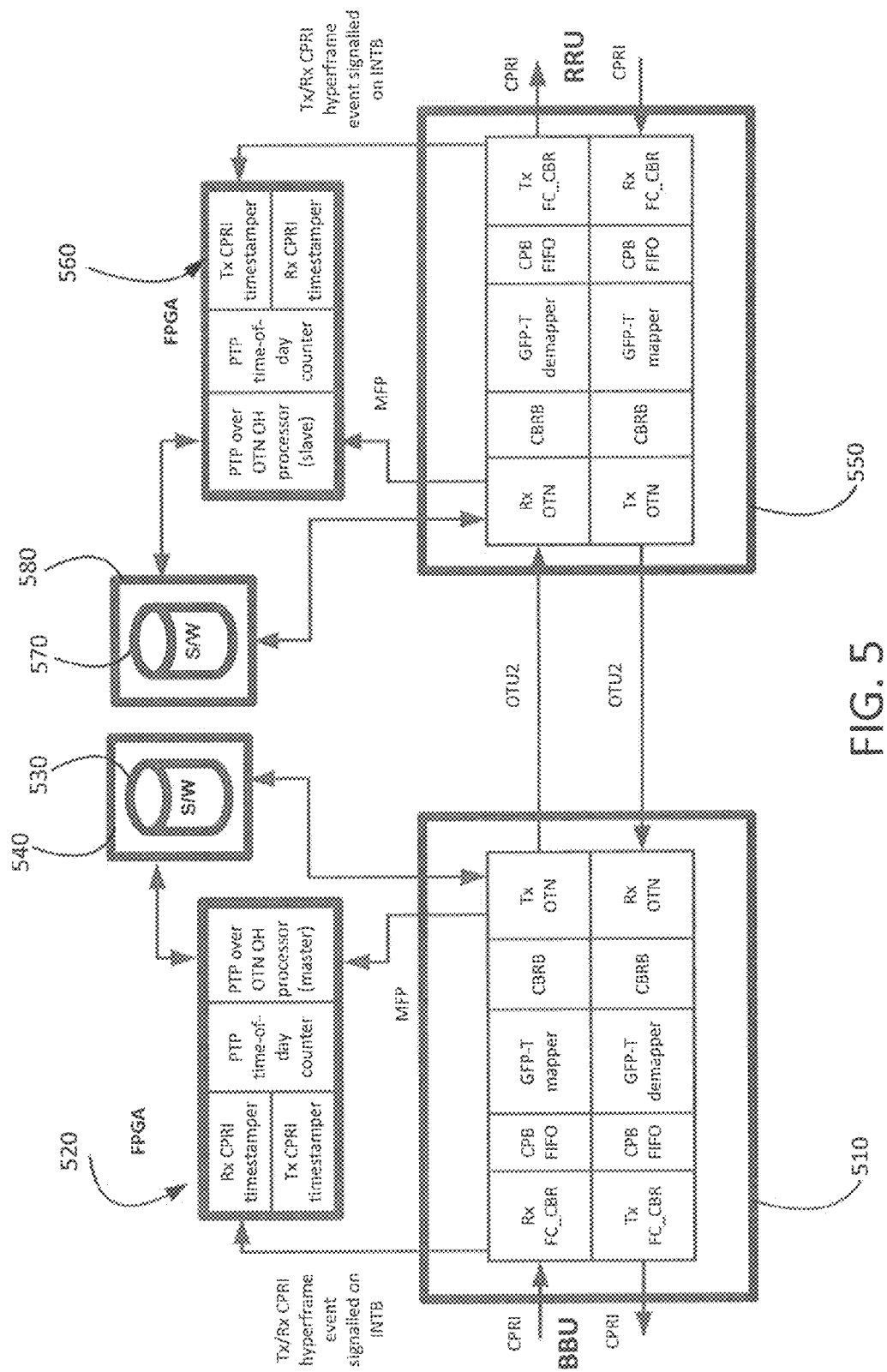
FIG. 5 illustrates a block diagram of a CPRI-over-OTN solution for measuring a one-way delay of a CPRI stream according to another embodiment of the present disclosure.

FIGS. 4 and 5 illustrate example implementations of embodiments of the present disclosure. The implementation in FIG. 4 includes: an OTN transport protocol device 410, such as an OTN framer or OTN transport protocol implementer; a programmable logic device 420, such as a supporting FPGA, in communication with the OTN transport protocol device 410; and a non-transitory machine readable medium 430, represented in FIG. 4 as a database, storing statements and instructions, such as in software or firmware, for implementing a method as described herein. In FIG. 4, the OTN transport protocol device 450, programmable logic device 460 and non-transitory machine readable medium 470 are similar to the OTN transport protocol device 410, programmable logic device 420 and non-transitory machine readable medium 430.

In an example embodiment, the OTN transport protocol device 410 is configured to perform OTN mapping and multiplexing functions which may not be provided by a typical OTN Framer. In the embodiment of FIG. 4, the non-transitory machine readable medium 430 and statements and instructions stored thereon are implemented in firmware and provided as part of the OTN transport protocol device 410. In contrast, in the embodiment of FIG. 5, the statements and instructions are implemented in software in the non-transitory machine readable medium 470. In an example embodiment as shown in FIG. 4, the method of embodiments of the present disclosure runs on the internal CPU of the OTN transport protocol device 410 or 450. In another embodiment as shown in FIG. 5, the method of embodiments of the present disclosure is running on an external CPU 540 or 580, which is in communication with the OTN transport protocol devices 510 or 550, respectively.

In an example embodiment, the OTN transport protocol device 410, or OTN framer, puts the CPRI into the OTN, and the sideband channel is OTN overhead, so it also carries the sideband messages. The OTN transport protocol device 410 detects the control character, such as a K28.5 character in the CPRI client, and sends it to the FPGA 420 to detect when that happened. A CBR processing function receiver, shown in FIGS. 4 and 5 as RX_FC_CBR sees a K28.5, and is in communication with the FPGA 420 to have the time that this occurred recorded. There is a similar implementation at the transmit (TX) side, to record the time that the control character exits the OTN network.

As shown in FIG. 4, the programmable logic devices, or FPGAs, 420 and 460 are configured to perform time alignment between the OTN transport protocol devices 410 and 450. The two OTN transport protocol implementers, or network endpoints, have the same time scale and epoch. In an example embodiment, the FPGA 420 is provided on the same circuit board as the OTN transport protocol implementer 410, to perform time alignment and time recording. In another embodiment, the FPGA 420, or one or more of the functions performed therein, could be integral with the OTN transport protocol device 410.

FIG. 4 illustrates a block diagram of a CPRI-over-OTN solution for measuring a one-way delay of a CPRI stream according to an embodiment of the present disclosure. Further details will now be provided regarding an example implementation.

FIG. 4 shows an implementation in which most of the work is performed by the firmware implemented in the non-transitory machine readable medium 430 provided in the OTN transport protocol device 410. A programmable logic device 420, such as an FPGA, is provided to assist with the timestamping. In an example embodiment, the functions are split as follows.

In an embodiment, the OTN transport protocol device 410 in FIG. 4 is configured to perform the following functions with respect to PTP-over-OTN-Overhead: generate Tx and Rx OTUk MFP signals to FPGA for timestamping; get Tx and Rx OTUk MFP timestamps from FPGA 420 via specially marked Ethernet messages on the SGMII port; generate PTP messages and insert them into the OTUk overhead, with corresponding timestamp from FPGA 420, when necessary; extract PTP messages from OTUk overhead, and corresponding timestamp received from FPGA 420; send the PTP time-of-day to the FPGA via the IRIG or TOD Interface output port; and send the PTP clock frequency to the FPGA via the PGMRCLK output port. In an embodiment, these functions can also be performed by the OTN transport protocol device 450 in association with the FPGA 460. In an example embodiment, the OTN transport protocol device 410 acts as a master and the device 450 acts as a slave. The PTP slave, for example 450, is configured to recover PTP frequency and time-of-day; the PTP master, for example 410, is configured to receive PTP frequency and time-of-day via IRIG or ToD Interface input port.

The OTN transport protocol device 410, or the device 450, or both, in FIG. 4 is configured to perform the following functions with respect to CPRI delay measurement: detect the CPRI's K28.5 event and generate a signal to the associated FPGA for timestamping; receive the K28.5 timestamps from FPGA via specially marked Ethernet messages on SGMII port; send K28.5 disparity and timestamps to the other OTN endpoint over an OTN overhead-byte channel; receive K28.5 disparity and timestamps from the other OTN endpoint over an OTN overhead-byte channel; using the K28.5 disparity and timestamp information, measure the delay of the CPRI signal in the OTN network; based on delay measurement, perform CPRI latency adjustment to eliminate delay asymmetry. In an example embodiment, the sending of the K28.5 disparity and timestamps to the other OTN endpoint over an OTN overhead-byte channel can be performed by 410 or 450, or both; in an embodiment, the information needs to be received by at least one of 410 or 450, but alternatively can be received at both 410 and 450.

In an embodiment, the FPGA 420 in FIG. 4 is configured to perform the following functions with respect to PTP-over-OTN-Overhead: get PTP time-of-day from the OTN transport protocol device via an IRIG or TOD Interface and align its PTP time-of-day counter based on this; get the PTP clock frequency from the OTN transport protocol device via the PGMRCLK signal; and send the MFP timestamps back to the OTN transport protocol device via specially marked Ethernet messages on the SGMII port. In an embodiment, these functions can also be performed by the FPGA 460.

The FPGA 420, or the FPGA 460, or both, in FIG. 4 is configured to perform the following functions with respect to CPRI delay measurement: timestamp the CPRI K28.5 events that are provided by the OTN transport protocol device; and send the K28.5 timestamps back to the OTN transport protocol device via specially marked Ethernet messages on the SGMII port.

FIG. 5 illustrates a block diagram of a CPRI-over-OTN solution for measuring a one-way delay of a CPRI stream according to another embodiment of the present disclosure.

FIG. 5 shows an implementation where the PTP work is performed by the FPGAs 520 and 560 and an external processor 540 and 580, such as a CPU. The non-transitory machine readable media 530 and 580 store statements and instructions for execution by the processors 540 and 580, respectively, to perform a method according to an embodiment of the present disclosure as described herein. The CPRI delay measurement tasks in FIG. 5 are similar to that of FIG. 4. In an example embodiment, the functions are split as follows.

In an embodiment, the OTN transport protocol device 510 in FIG. 5 is configured to perform the following functions with respect to PTP-over-OTN-Overhead: generate Tx and Rx OTUk MFP signals to FPGA 520 for timestamping; insert PTP messages into the OTUk overhead, based on instructions provided by external CPU, or processor, 540 via the PCIe interface, extract PTP message from the OTUk overhead and, based on instructions provided by the external CPU, or processor, 540, deliver these messages to the external CPU, or processor, 540 via the PCIe interface. In an embodiment, these functions can also be performed by the OTN transport protocol device 550 in association with the FPGA 560 and the processor 580.

The OTN transport protocol device 510, or the device 550, or both, in FIG. 5 is configured to perform the following functions with respect to CPRI delay measurement: detect the CPRI's K28.5 event and generate a signal to the FPGA for timestamping; receive the K28.5 timestamps from FPGA via external CPU, on PCIe interface; send K28.5 disparity and timestamps to the other OTN endpoint over an OTN overhead-byte channel; receive K28.5 disparity and timestamps from the other OTN endpoint over an OTN overhead-byte channel; transfer the received K28.5 disparity and timestamps from the other OTN endpoint to the external CPU, via PCIe interface; based on latency tuning instructions received from the external CPU via the PCIe interface, perform CPRI latency adjustment to eliminate delay asymmetry.

The FPGA 520 in FIG. 5 is configured to perform the following functions with respect to PTP-over-OTN-Overhead: get instructions to align the PTP time-of-day from external processor 540; send the MFP timestamps to the external processor 540. In an embodiment, these functions can also be performed by the FPGA 560 in association with the processor 580.

The FPGA 520, or the FPGA 560, or both, in FIG. 5 is configured to perform the following functions with respect to CPRI delay measurement: timestamp the CPRI K28.5 events that are provided by the associated OTN transport protocol device; send the K28.5 timestamps to the associated external processor; and send the K28.5 timestamps back to the associated OTN transport protocol device via the associated external processor.

The External CPU, or processor 540, in FIG. 5 is configured to perform the following functions with respect to PTP-over-OTN-Overhead: give instructions to align the PTP time-of-day to FPGA; generate PTP messages and insert them into the OTN transport protocol device's OTUk overhead, via PCIe interface, with corresponding timestamp from FPGA, when necessary; extract PTP messages from the OTN transport protocol device's OTUk overhead, and correspond to the timestamp received from FPGA. In an embodiment, these functions can also be performed by the processor 580. In an example embodiment, the device 510 acts as a master and the device 550 acts as a slave. If PTP slave, for example 550, the associated processor 580 recovers PTP frequency and time-of-day; If PTP master, for example device 510, the associated processor 540 receives PTP frequency from external PTP grandmaster or GPS.

The External processor 540, or processor 580, or both, in FIG. 5 is configured to perform the following function with respect to CPRI delay measurement: receive the local CPRI K28.5 timestamps from the local FPGA; transfer the local CPRI K28.5 timestamps from the FPGA and their disparity to the local OTN transport protocol device, via PCIe interface; receive the remote CPRI K28.5 timestamps and disparity via the OTUk overhead of the local OTN transport protocol device, via PCIe interface; using the local and remote CPRI K28.5 timestamps and disparity, measure the uplink and downlink delays; using the measured uplink and downlink delays, instruct the OTN transport protocol device to adjust its latency, if desired, via PCIe interface;

Referring back to the earlier discussion, the control character can comprise a periodically-recurring control character, such as K28.5, or a non-periodically recurring control character. In an embodiment, the control character comprises a non-periodically-recurring control character which is non-periodic with respect to a period of measurement. In such an example embodiment, the pattern comprises a pattern of time gaps between the successive occurrences of the non-periodically recurring control characters. Embodiments of the present disclosure implemented with non-periodically-recurring control characters can include one or more of the following features.

Instead of using random 8B/10B CRD sequences to align the timestamps of time periodic events, in such alternative embodiments a method aligns sequences of random time events of fixed 8B/10B CRD patterns. This method enables measurement of the latency of client data streams other than CPRI. For instance, for a Gigabit Ethernet (GE) data stream that is mapped as a CBR client into OTN (as per the standardized TTT mapping), Start-of-Frame (SOF) events can be timestamped and aligned on the two sides of the OTN network. Because the SOF events all start with K27.7 of negative CRD and are not periodic, the timestamp alignment process would have to be modified. For a GE stream with random packet sizes and less than 100% fill capacity, the SOF events will have a somewhat random spacing from each other. Thus, the time spacing sequence of many consecutive SOFs can be used as the timestamp alignment criteria.

Transport network protocols other than OTN, such as Ethernet, can be used. GPS could be used instead of PTP to provide timescale and epoch alignment on the two sides of the transport network.

Recent trends in mobile communications show that fine phase synchronization is growing in importance. OTN is evolving into the de-facto layer 1 protocol for high bandwidth wireline communications because of its flexible time-division-multiplexing capabilities, forward error correction based optical reach enhancement, and OAM capabilities. Embodiments of the present disclosure allow the client synchronization requirements to be served by OTN, enabling the convergence of these two growing trends. Embodiments of the present disclosure can be used to enable OTN to be used in the high-growth CRAN (Cloud Radio Access Network, also known as the Centralized Radio Access Network) fronthaul application space.

Embodiments of the present disclosure allow an OTN Transport Network to meet the uplink/downlink symmetry requirements of its CPRI clients, for use in a Radio Access Network. Embodiments of the present disclosure enables delays, induced upon a CPRI client, that are associated with any number of OTN mapping and multiplexing functions and of the optical links in the OTN network, to be measured. Embodiments of the present disclosure allow the delays to be measured without modifying the CPRI client, and allow any arbitrarily large OTN transport delay to be measured. Embodiments of the present disclosure allow delay measurement to be measured periodically, and to be performed over transport protocols other than OTN.

Embodiments of the present disclosure enable symmetric-latency sensitive clients such as CPRI to be transported over an OTN network with any number of multiplexing and demultiplexing stages, with any magnitude of delay, with appropriately small and deterministically bounded loss of performance, and with only a light hardware and computing effort cost.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method of measuring a one-way delay of an 8B/10B encoded data stream transported over a transport network, the method comprising:
    timestamping, at a network entry and at a network exit, successive occurrences of a control character in the 8B/10B encoded data stream;
    identifying, at the network entry and the network exit, a pattern associated with the successive occurrences of the control character;
    sending, over a side channel separate from the 8B/10B encoded data stream, information related to the patterns identified at the network entry and at the network exit; and
    determining the one-way delay based on a difference between the information related to the pattern identified at the network entry and the information related to the pattern identified at the network exit.

2. The method of claim 1 wherein the control character comprises a periodically-recurring control character, wherein each of the successive occurrences of the control character have associated therewith a current running disparity (CRD), and wherein the pattern comprises a sequence of the CRDs of the periodic control characters.

3. The method of claim 2 wherein the periodically-recurring control character comprises a comma character used for synchronization.

4. The method of claim 2 wherein the 8B/10B encoded data stream comprises a Common Public Radio Interface (CPRI) stream, and wherein the periodically-recurring control character comprises a K.28.5 character.

5. The method of claim 4 further comprising:
    associating each timestamp with a specific CPRI Hyperframe at the network entry and at the network exit to facilitate measurement of the one-way delay.

6. The method of claim 1 wherein the control character comprises a non-periodically-recurring control character which is non-periodic with respect to a period of measurement, and wherein the pattern comprises a pattern of time gaps between the successive occurrences of the non-periodically recurring control characters.

7. The method of claim 1 wherein the transport network comprises an optical transport network (OTN).

8. The method of claim 1 wherein the timestamping, identifying, sending and determining are performed without modifying the 8B/10B encoded data stream.

9. The method of claim 1 wherein the one-way delay comprises an uplink latency, and wherein timestamping, identifying, sending and determining are performed to determine the uplink latency.

10. The method of claim 1 wherein the one-way delay comprises a downlink latency, and wherein timestamping, identifying, sending and determining are performed to determine the downlink latency.

11. The method of claim 1 further comprising recording a timestamp value associated with the timestamping.

12. The method of claim 11 wherein the timestamping comprises generating a plurality of timestamps, and further comprising recording a plurality of timestamp values associated with the plurality of timestamps prior to the sending of the information over the side channel.

13. The method of claim 1 wherein the information related to the patterns identified at the network entry and at the network exit comprises a timestamp value.

14. The method of claim 2 wherein the information related to the patterns identified at the network entry and at the network exit comprises a timestamp value and a corresponding CRD.

15. A non-transitory machine readable medium having stored thereon statements and instructions for execution by a processor to perform a method of measuring a one-way delay of an 8B/10B encoded data stream transported over a transport network, the method comprising:
    timestamping, at a first network endpoint, successive occurrences of a control character in the 8B/10B encoded data stream;
    identifying, at the first network endpoint, a pattern associated with the successive occurrences of the control character;
    sending, over a side channel separate from the 8B/10B encoded data stream, information related to the pattern identified at the first network endpoint; and
    determining the one-way delay based on a difference between the information related to the pattern identified at the first network endpoint and information related to a pattern associated with successive occurrences of the control character at a second network endpoint.

16. The non-transitory machine readable medium of claim 15 wherein the information related to the patterns identified at the network entry and at the network exit comprises a timestamp value.

17. The non-transitory machine readable medium of claim 15 wherein the method further comprises recording one or more timestamp values associated with the timestamping prior to the sending of the information over the side channel.

18. A system for measuring a one-way delay of an 8B/10B encoded data stream transported over a transport network, the system comprising:
- first and second timestampers, provided at a network entry and at a network exit, respectively, configured to timestamp successive occurrences of a control character in the 8B/10B encoded data stream;
- first and second timestamp processors configured to identify, at the network entry and the network exit respectively, a pattern associated with the successive occurrences of the control character; and
- first and second transport network devices configured to send, over a side channel separate from the 8B/10B encoded data stream, information related to the patterns identified at the network entry and at the network exit;
- the first and second transport network devices cooperating to determine the one-way delay based on a difference between the information related to the pattern identified at the network entry and the information related to the pattern identified at the network exit.

19. The system of claim 18 wherein the first timestamper and the first timestamp processor are integral with the first transport protocol device.

20. The system of claim 18 wherein the second timestamper and the second timestamp processor are integral with the second transport protocol device.

21. A system for measuring a one-way delay of an 8B/10B encoded data stream transported over a transport network, the system comprising:
- first and second programmable logic devices, provided at a network entry and a network exit, respectively, configured to timestamp successive occurrences of a control character in the 8B/10B encoded data stream and to identify a pattern associated with the successive occurrences of the control character;
- first and second transport network devices, in communication with the first and second programmable logic devices, respectively, configured to send, over a side channel separate from the 8B/10B encoded data stream, information related to the patterns identified at the network entry and at the network exit;
- one or more processors; and one or more non-transitory machine readable memories storing statements and instructions for execution by the one or more processors to determine the one-way delay based on a difference between the information related to the pattern identified at the network entry and the information related to the pattern identified at the network exit.

* * * * *